H. BOCK.

Machines for Making Glass Buttons.

No. 5,517. Reissued August 5, 1873.

Witnesses.

D. P. Parker.

Chas. L. Schutkowski

Inventor.

Henry Bock.

AM. PHOTO-LITHOGRAPHIC CO. N.Y. (OSBORNE'S PROCESS)

UNITED STATES PATENT OFFICE.

HENRY BOCK, OF NEW YORK CITY, ASSIGNOR TO WILLIAM W. McFARLAN, OF BROOKLYN, NEW YORK.

IMPROVEMENT IN MACHINES FOR MAKING GLASS BUTTONS.

Specification forming part of Letters Patent No. 46,330, dated February 14, 1865; reissue No. 5,517, dated August 5, 1873; application filed May 15, 1873.

*To all whom it may concern:*

Be it known that I, HENRY BOCK, of the city, county, and State of New York, have invented a new and Improved Machine for Making Glass Buttons; and I do hereby declare that the following is a full and exact description thereof, reference being had to the accompanying drawings forming part of this specification, in which—

Figure 1:
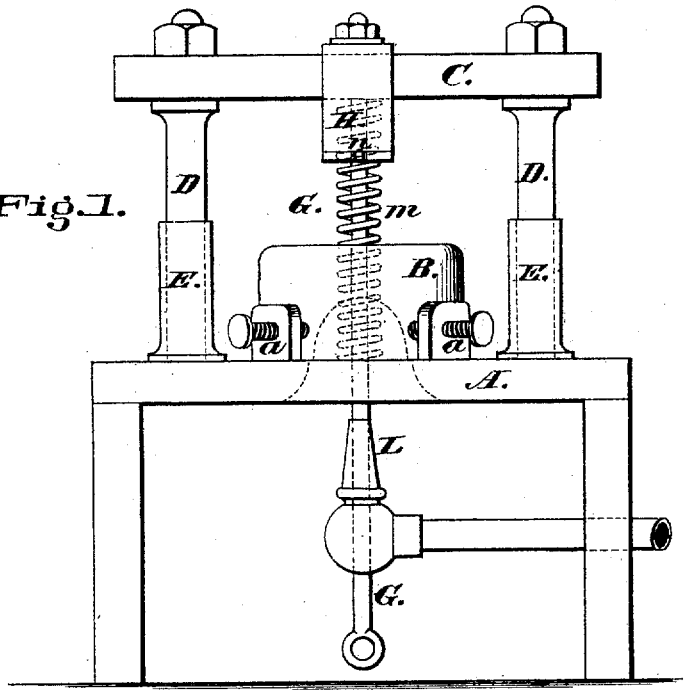
Figure 2:
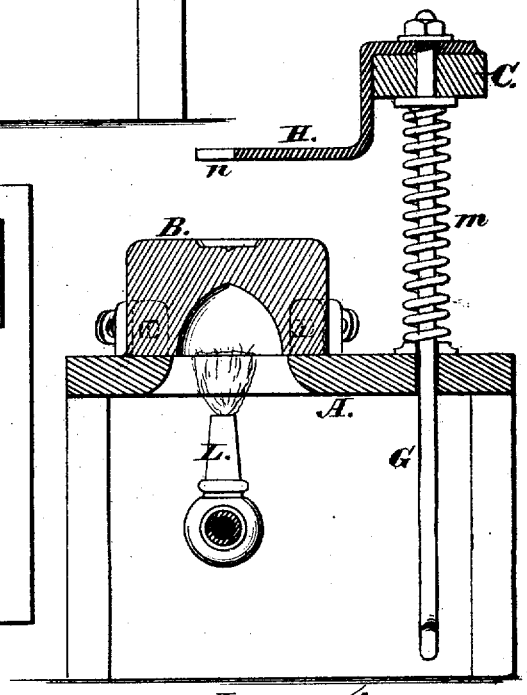
Figure 3:
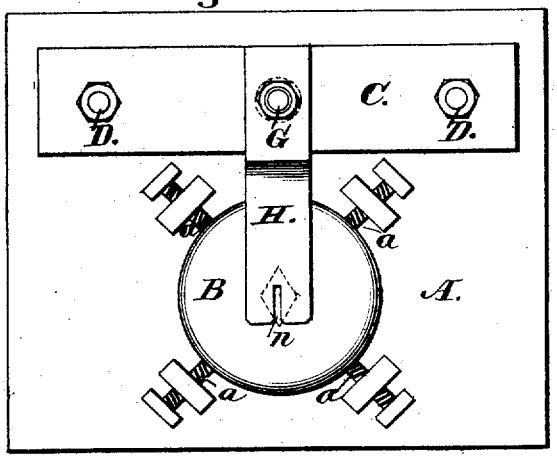

Figure 1 is a front view. Fig. 2 is a cross-section. Fig. 3 is a plan of my improved machine.

Prior to my invention the method of making glass buttons was to melt the glass upon the metal eye of the button by means of the flame of a blow-pipe, and when a sufficient quantity of glass had been put on to press the same by hand into a die of the shape requisite to give the desired configuration to the button. By this method a great difficulty was experienced in giving sharp and distinct angles to buttons when the same were required, and it was almost impossible to make square or triangular shaped buttons with sharp corners and edges, as the glass had to be pressed into the die by hand, and the eye, held by a pair of pinchers, was pressed into the glass.

My improvement consists, first, in the arrangement of a plunging plate or presser above the die-block, which acts upon the back of the button, forcing the eye into the glass, while the glass is at the same time pressed into the countersunk die, whereby the plastic glass is forced into the extreme angles of the die, and produces a face on the button corresponding perfectly with the shape of the die; secondly, in constructing the plunging plate or presser with a slot or recess to receive the eye or projection from the button while the face is being molded; and, thirdly, in providing devices by which the die shall be kept when in use at a temperature sufficiently high to preserve the fire-polish on the face of the molded glass.

In the accompanying drawings, A is a plate to which the die-block B is attached by means of screws *a a*, or any other suitable means of connection. The die-block B is constructed with a recess in the under side thereof to accommodate a flame, L, from a gas-burner or other source, which is arranged therein to heat the die, and thus preserve the fire-polish and prevent the breaking of the button, which would ensue from its sudden contact with the cold metal. C is a cross-bar, which moves upward and downward, guided by means of the rods D D moving in the sockets E E, which are fast to the plate A, or by any other equivalent mode of guidance. To the middle of the bar C a rod, G, is attached, passing through the plate A and below the table or bench to which the machine is fixed. To the bottom of this rod a strap or pedal is attached to accommodate the foot of the operator, by means of which the cross-bar C is forced downward. Around the upper end of the rod G a spiral spring, *m*, is placed, between the cross-bar C and the plate A, to throw the cross-bar C upward when relieved from the pressure of the foot. To the cross-bar C the plunging plate or presser H is firmly attached, with its extremity moving perpendicularly over the die in the block B. In the end of this plunger or presser H is made a slot or recess, *n*, for the purpose of receiving the eye or shank of the button, while the pressure of the plunger H is exerted on the glass or back of the button, and preventing the eye from being forced clear into the glass.

The operation of making glass buttons with this machine is as follows: After a sufficient quantity of glass has been attached to the metal eye of the button in the usual manner, the eye is pressed into the slot *n* at the end of the presser H, so that the heated glass will come between the presser H and the die in the block B, or the lump of plastic glass may be placed in the die and the eye placed in the slot *n*. The bar C, together with the presser H attached thereto, is then suddenly forced downward by the action of the operator's foot applied at the end of the rod G, by which operation the eye is firmly embedded in the back of the button, while the plastic glass forming the button is forced into the countersunk die and pressed, through the action of the plunger H, into every angle and corner thereof, so as to secure a perfect and sharply-defined configuration of the button. The end of the rod G being relieved from the pressure of the operator's foot, the spring *m* will throw the cross-bar C and the presser H upward. The button is removed and the operation repeated.

Having thus described my invention, I do not claim the process of making glass buttons by means of a die; but

What I claim as my invention, and desire to secure by Letters Patent, is—

1. In a press for making buttons of plastic material, a plunger or presser having a slot or recess, *n*, for the purposes specified.

2. The combination of a die for giving shape to a button with a presser having a slot or recess, *n*, for the purposes specified.

3. A die and presser for molding plastic material, in combination with the heating devices, substantially as and for the purposes described.

HENRY BOCK.

Signed in presence of—
A. H. NONES,
CHAS. F. ZUNER.